No. 826,018. PATENTED JULY 17, 1906.
I. R. CONCOFF.
HOSE COUPLING.
APPLICATION FILED NOV. 21, 1904.

Witnesses:
P. V. Meikle
Ella Anderson

Inventor,
Isaac Robert Concoff
by T. J. Geisler
Atty.

THE NORRIS PETERS CO., WASHINGTON, D. C.

UNITED STATES PATENT OFFICE.

ISAAC ROBERT CONCOFF, OF PORTLAND, OREGON.

HOSE-COUPLING.

No. 826,018.　　　　　Specification of Letters Patent.　　　　Patented July 17, 1906.

Application filed November 21, 1904. Serial No. 233,770.

*To all whom it may concern:*

Be it known that I, ISAAC ROBERT CONCOFF, a citizen of the United States, and a resident of Portland, in the county of Multnomah and State of Oregon, have invented a new and useful Improvement in Hose-Couplings, of which the following is a specification, reference being had to the accompanying drawings as constituting a part thereof.

My invention relates more especially to devices for coupling together the ends of sections of hose.

The object of my invention is to obtain a coupling which is simple in its construction, comparatively inexpensive, and durable, and, further, to make my coupling of such construction that it may be coupled and uncoupled in a moment, that it will be secured against accidental uncoupling, and that it can withstand blows and knocks to which it is subjected while in service with impunity. To this end my coupling is constructed as illustrated in the said drawings, in which—

Figure 4:
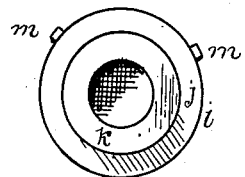
Figure 1:
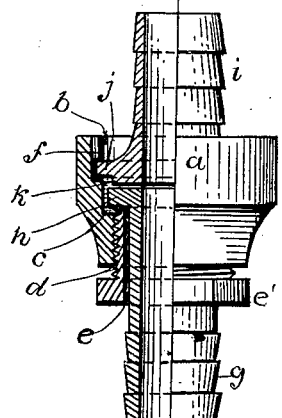
Figure 2:
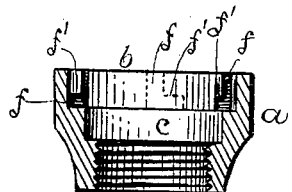
Figure 3:
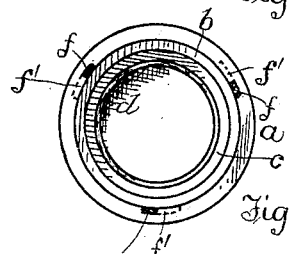

Figure 1 is a plan of my coupling, half in section. Fig. 2 is a section of the female part of the coupling. Fig. 3 is a view of the coupling end of such female part, and Fig. 4 is a view of the coupling end of the male part.

The letters designate the parts referred to.

The female part of my coupling consists of a socket $a$, made with recesses $b$ $c$, and a threaded aperture or port $d$. In the aperture $d$ is inserted a sleeve-nut $e$, made with a wrench-head $e'$. The socket $a$ is further made with three L-shaped slots $f$. (See Figs. 2 and 3.) The interior annular surface of the sleeve $e$ is smooth-faced, and inserted in such sleeve is a nipple $g$, made with a flat flange-like head $h$, which is seated on the rim of the sleeve-nut $e$ and having a shank adapted to have the end of a hose secured thereto in the usual manner. The male part or nipple $i$ comprises a shank, also adapted to have the end of a hose-section secured thereto in the usual manner, and the head end $j$ of the nipple $i$ is made with a projecting flange and a boss $k$ and laterally-projecting lugs $m$, arranged to enter the L-slots $f$ of the socket $a$.

In coupling the two parts together the nipple or male part $i$ is inserted in the socket $a$, the lugs $m$ entering the slots $f$. Either part is then given a partial turn, so as to cause the lugs $m$ to enter the right-angular section of the slots $f$ and engage with the shoulder $f'$ thereof. When the parts have thus been coupled together, the boss $k$ on the head $j$ of the nipple $i$ will be in contact with the head $h$ of the nipple $g$. All now required to be done to lock the two coupling parts together is to give the sleeve-nut $e$ a partial turn—that is to say, such action would cause the sleeve-nut $e$ to jam the head of the nipple $g$ against the head of the nipple $i$ and cause the lugs $m$ on the head of the latter to bind in their slots $f$. To uncouple the parts, the sleeve-nut $e$ is again given a partial turn in the reverse direction, upon which the lugs $m$ may be disengaged from the slots $f$ and the parts separated.

The advantages of my improved coupling are: The only threaded part of it—the sleeve $e$—is never required to be removed, and therefore the annoyance due to cross-threading of couplings is entirely eliminated. There is no exposed thread to be burred up and rendered useless. My coupling is always ready for immediate use. There is no time consumed in carefully fitting one part into the other. The head of the nipple or male part $i$ may be inserted in the socket $a$ in a moment, and another moment will be sufficient to turn up the sleeve $e$ to lock the coupling.

Instead of making the head of the sleeve-nut $e$ a wrench-head, the same may be made with a spanner-wrench head or in some other way, as will readily suggest itself to any mechanic, so that the sleeve may be readily turned up by hand to lock my coupling without the use of any wrench. Furthermore, the socket $a$ receives most of the blows while my coupling is in active service and protects the sleeve-nut and its threaded seat in the socket from wear and also protects the sleeve-nut against being knocked loose.

It is preferable to make the head $j$ of the nipple $i$ with a boss $k$ so as to adapt the same to have a more ready and better fit upon the opposite face of the head of the nipple $g$, and, if preferred, said opposite bearing-face of the nipple-head $h$ may be made with a concavity so as to obtain a ball-joint when said parts bear against each other.

Having fully described my invention, what I claim, and desire to secure by Letters Patent, is—

In a hose or pipe coupling, the combination of a female part comprising a recess or chamber $b$, a recess or chamber $c$ of smaller diameter than the former, and a threaded port of smaller diameter than the latter; the walls of the chamber $b$ being made with L-shaped recesses or slots $f$; a male part or nipple $i$ made with a head having a diameter to fit the chamber $b$ of the female part and provided with rim-lugs $m$ adapted to enter the slots of the latter; a nipple $g$, made with a head adapted to bear against the head of the nipple $i$, and said head having a diameter to fit the chamber $c$ of the female part, and a sleeve or jam-nut $e$, inserted in the threaded port of the female part, whereby to jam the head of the nipple $g$ against the head of the nipple $i$.

In testimony whereof I have hereunto affixed my signature in the presence of two witnesses.

ISAAC ROBERT CONCOFF.

Witnesses:
T. J. GEISLER,
ELLA ANDERSON.